March 17, 1970  W. L. CISSEL, JR  3,501,032
SOD LOADING APPARATUS AND METHOD
Filed Dec. 6, 1967  3 Sheets-Sheet 1

INVENTOR
WILLIS LAMBERT CISSEL, JR.
BY
Mason, Mason & Albright
ATTORNEYS

INVENTOR
WILLIS LAMBERT CISSEL, JR.
BY
Mason, Mason & Albright
ATTORNEYS

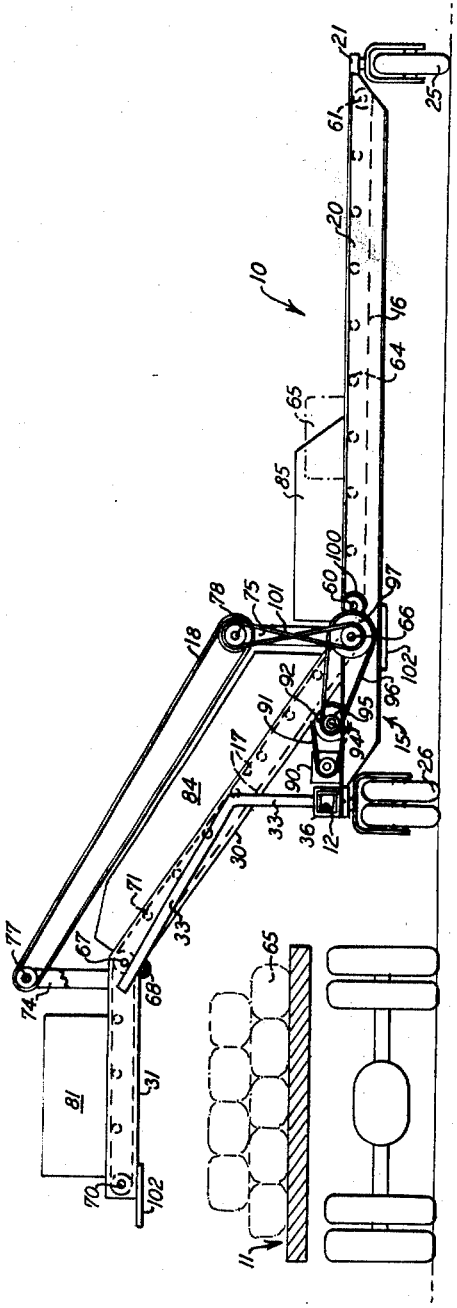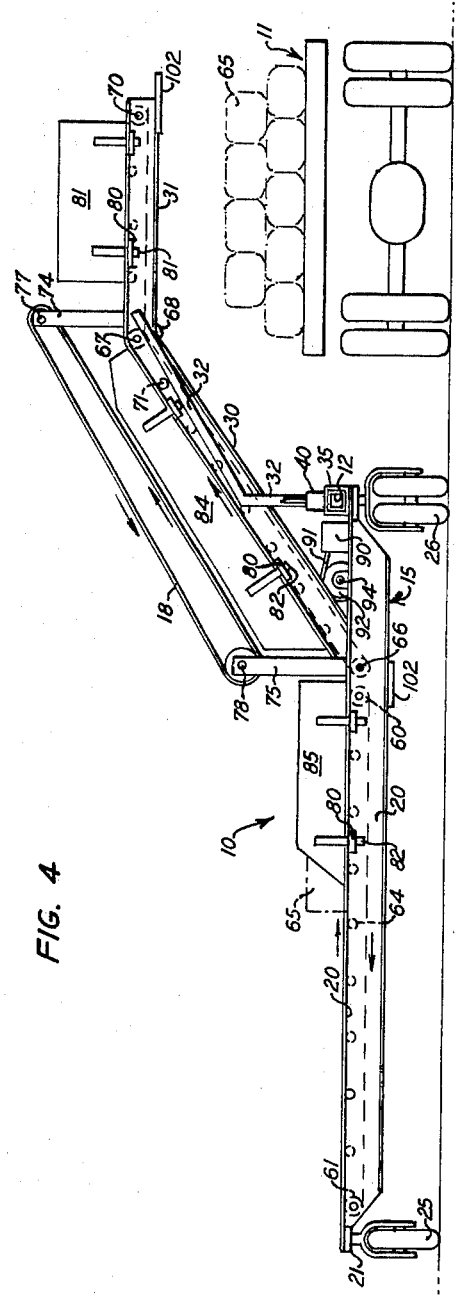
FIG. 4
FIG. 5
INVENTOR
WILLIS LAMBERT CISSEL, JR.
BY
Mason, Mason & Albright
ATTORNEYS

United States Patent Office 3,501,032
Patented Mar. 17, 1970

3,501,032
SOD LOADING APPARATUS AND METHOD
Willis Lambert Cissel, Jr., Box 79AA,
Brookeville, Md. 20729
Filed Dec. 6, 1967, Ser. No. 688,485
Int. Cl. B66p 1/36; B65g 67/08
U.S. Cl. 214—83.26
6 Claims

ABSTRACT OF THE DISCLOSURE

A sod loader attachment for a truck comprising a conveyor belt system extending normally to the truck bed adapted to convey sod rolls placed on the conveyor to the bed of the truck where they are manually removed and loaded. A bar parallel to the longitudinal axis of the truck is firmly secured thereto and the loader is movably connected to the bar. Locking means detachably secures the loader to the bar so as to permit selective movement between the bar and the loader. When the truck moves forward, temporary unlocking of the locking means results in the loader relocating itself farther back relative to the truck bed whereby the sod rolls are delivered to the area of the truck bed where they are being stacked.

BACKGROUND OF THE INVENTION

The invention relates to apparatus and method of loading sod rolls in which an elongated conveyor mechanism is supported on wheels and attached to a truck whereby it moves over a field having rolls of sod disposed thereon along with the truck. The invention is particularly concerned with such an apparatus and method wherein the sod loader is selectively moved relative to the truck bed.

At present the conventional method of loading trucks for the transportation of sod rolls is manual. Sod rolls are generally left on the field where they have been rolled by a sod rolling apparatus. The truck then travels to the vicinity of the sod rolls and four men work as a team to carry them from the field to the truck and stack same on the truck bed. The work is both strenuous and dirty. With conventional devices it presently takes such a team about forty-five minutes on the average to load a single truck. Each sod roll must be carried by hand from its place in the field, manually raised to another worker on the bed of the truck, and stacked in place. A considerable amount of dust is generated in the area of the truck and the sod is often injured in the process.

It occurred to the inventor that a sod conveying system could reduce the physical labor incident to present loading devices and result in less injury to the sod rolls. It was considered that such a conveying device should be readily attachable to and detachable from the truck and, when attached, capable of moving with the truck despite irregularities in the surface of the ground. Additionally, the attachment should extend substantially to the vicinity of the sod on the ground and be at a level compatible with loading the sod into the conveyor manually from the ground with a minimal effort. Preferably the attachment should be capable of operating from either side of the truck. Additionally, the sod should be delivered to the truck at a height and place most compatible with its efficient removal and loading.

SUMMARY OF THE INVENTION

The conveyor system comprises a horizontal belt extending normally to the truck bed upon which the sod rolls are loaded from the field. A second belt angles sharply upward from the first to bring the sod to a horizontal position extending over the truck bed. An overhead belt prevents the sod from toppling from the inclined portion. The entire system is quickly attached and detached from the truck and is selectively movable relative to the truck bed for loading convenience.

It has been found that by utilization of the invention, the average time in which to load a truck is reduced by a third or more, that physical effort required for loading is considerably reduced and the job is less dirty for the individuals who manually lift and load the sod rolls. There is less injury to the sod and more dirt is returned to the field. In addition, the device tends to segregate stones caught in the sod when it is lifted whereby the stones are removed from the field.

The object of this invention constitutes the realization of an effective and practical method and apparatus which meets the problems and presents the advantages indicated above. Other objects, adaptabilities and capabilities will appear as the description progresses, reference being had to the accompanying drawings, in which:

BRIEF DESCRIPTION OF THE DRAWINGS

FIGURES 4 and 5 are elevational side views of the sod loader; and

DESCRIPTION OF THE PREFERRED EMBODIMENT

Figure 1:
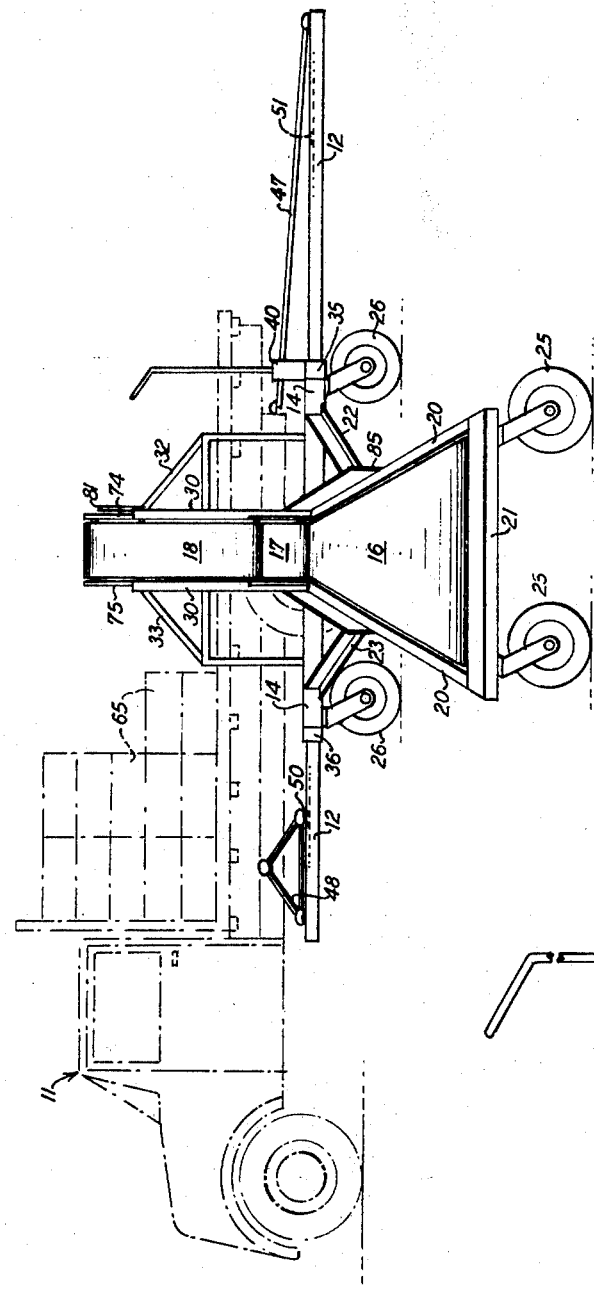
FIGURE 1 shows in a side perspective view a sod loader attached to a truck in accordance with the invention.

Referring now to the figures, it will be seen that the sod loading attachment designated generally by reference numeral 10 is connected to a flat bed truck designated 11 by horizontal means comprising a horizontal bar 12 which is slidably carried in sleeve 14. The sleeve 14 is rigidly connected to and comprises part of a framework 15 which supports for rotation a plurality of conveyor means 16, 17 and 18. Framework 15 comprises a pair of parallel I-beams 20 which are secured forwardly by beam 21 and on the rearward side, to the sleeve 14. The rigid relationship of the I-beams 20 with the sleeve 14 is reinforced by a pair of struts 22 and 23 which are welded or otherwise firmly secured and biased between the sleeve 14 on one hand and the beams 20 on the other. The forward end of the sod loading attachment 10 is supported on the ground by a pair of caster wheels 25 connected to beam 21 and, in the vicinity of the truck, by double caster wheels 26 which depend from sleeve 14. Inclined upwardly and towards the truck at an initial pitch of between 30 and 40 degrees are a pair of I-beams 30 which include horizontal portions 31 adapted to extend over the truck bed. The inclined I-beams 30 are rigidly attached on their lower ends to the I-beams 20 and their rigid relationship therewith is reinforced by braces 32 and 33 which are welded or otherwise secured on one end to the sleeve 14 and in their upper aspects to the inclined I-beams 30 including the horizontal portions 31 as shown in the figures.

Welded or otherwise secured to opposite ends of the sleeve 14 are guidance means 35 and 36. The guidance means 35 and 36 receive the horizontal bar 12 within close tolerances and additionally act as a bearing surface therefor.

Figure 2:
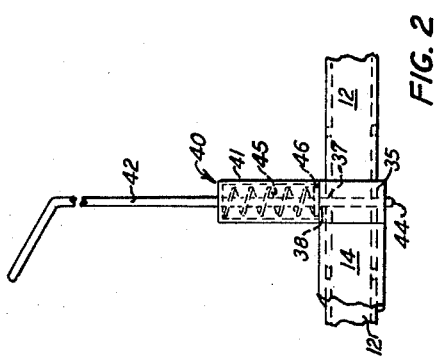
FIGURE 2 is an enlarged fragmentary view showing the means for locking the sod loader relative to the truck.
Figure 3:
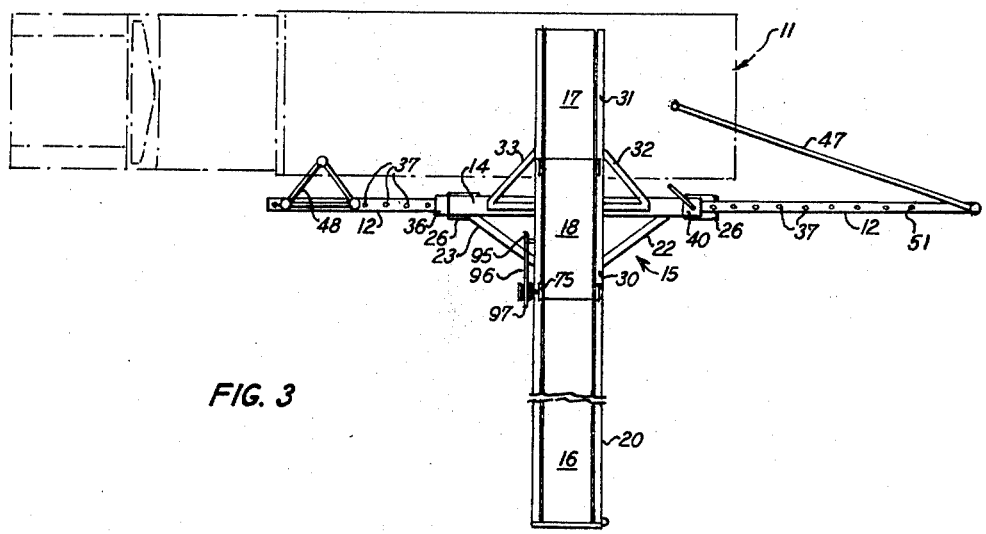
FIGURE 3 is a plan view of the sod loader as shown in FIGURE 1.

It will be noted in FIGURE 3 that the horizontal bar includes a plurality of apertures 37. From FIGURE 2 it is to be seen that a locking means 40 is firmly attached by welding or similarly secured to the guidance means 35 by a bonnet 41. An opening in the upper portion of bonnet 41 slidably receives a locking pin 42. The locking pin 42 includes in its lower aspect a locking portion 44 adapted to be received in apertures 37 and corresponding openings 38 in the guidance means 35. A compression spring 45 bears on its upper end against the bonnet 1 and on its bottom against a disc 46 secured to the locking pin 42 whereby the locking portion 44 is urged downwardly into the underlying aperture 37. By lifting the locking pin 42, whereby spring 45 is compressed, locking portion 44 may be drawn clear of the aperture 37. In such condition, horizontal bar 12 is slidable within sleeve 14 including guidance means 35 and 36 until the next succeeding aperture 37 comes under portion 44 whereupon bar 12 is again locked in position by spring 45 urging locking portion 44 into such underlying aperture 37.

The horizontal bar 12 is connected to the truck 11 by means of a connecting bar 47 and a connecting triangle 48, the latter being in the form of an isosceles triangle. The connections on the truck 11 and the horizontal bar 12 are readily removable ball-type socket joints of the type frequently used for the attachment of trailers and the like to automobiles and trucks. These are conventional and generally widely known; therefore, their exact nature is not necessary for an understanding and use of the invention by persons skilled in the art. However, it will be understood that the ball member 50 may be threadably received in bar 12 or otherwise removable from its location on bar 12 as shown in the FIGURE 1 and may be placed instead in a threaded opening 51 located at the opposite end of the horizontal bar 12. This arrangement permits the use of the attachment 10 on either side of the truck 11 by simply reversing the position of the ball member 50 relative to the horizontal bar 12 together with the connecting triangle 48 and the connecting bar 47.

Figure 6:
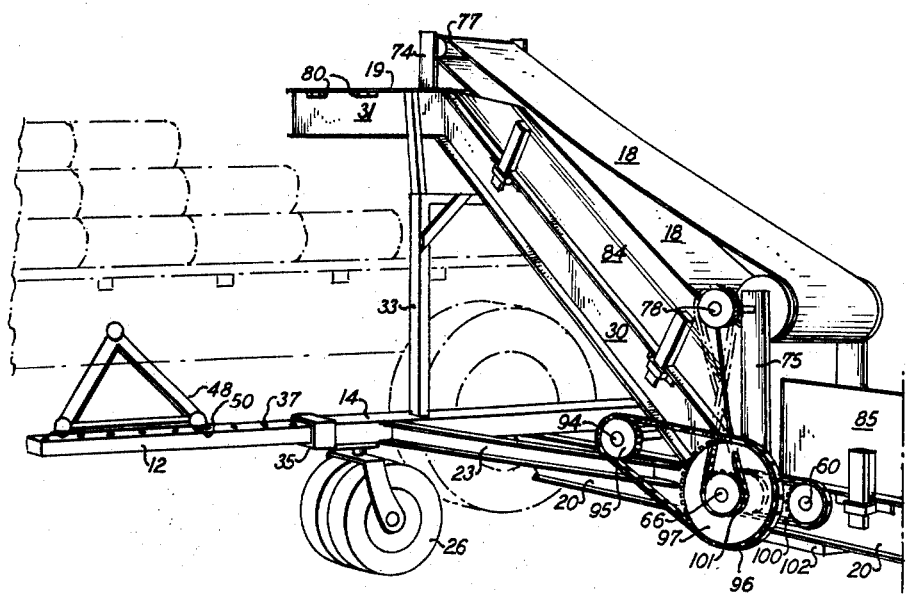
FIGURE 6 is a perspective view showing the structure of the invention in the forward area adjacent the truck.

Referring to FIGURES 4 and 5, it will be seen that a horizontal conveyor belt 16, which may be composed of wire or solid material, is rotatable, in a clockwise direction as seen in the FIGURE 5, about a pair of pulleys 60 and 61 and a plurality of intermediate supporting rollers 64, all of which are rotatively secured to the I-beams 20. Sod rolls designated 65 are shown carried thereon. The inclined conveyor 17 which also rotates in a clockwise direction as seen in FIGURE 5, is turned by shaft 66, passes over and between idler shafts 67 and 68 to a horizontal position over the truck 11, as shown, wherein it turns on shaft 70; the shafts 66, 67, 68 and 70 all being rotatably journaled to the inclined I-beams 30, including, for shaft 70, the horizontal portions 31. The adjoining ends of the horizontal conveyor 16 and the inclined conveyor 17 are located approximately one inch apart. A collector means comprising a wire basket 102 is detachably secured to the I-beams 20 under the end of conveyor 10 to catch stones and the like discharged therefrom. A similar basket means may be secured to portions 31 under the end of conveyor 17 as shown in FIGURES 5 and 6. Rollers 71, also journaled to the I-beams 30, are provided to support the inclined conveyor 17 and sod rolls 65 thereon. Upper and lower struts 74 and 75 respectively welded or otherwise rigidly secured to the inclined I-beams 30, carry the overhead inclined conveyor 18 through a pair of shafts 77 and 78 journaled to the supports 74 and 75, respectively. As seen in FIGURE 5, the overhead inclined conveyor 18 rotates in a counterclockwise direction. The conveyors 17 and 18 are spaced vertically approximately two feet apart with the distance being slightly greater between the shafts 66 and 78 than between the shafts 67 and 77.

As can be seen in FIGURES 5 and 6, the horizontal portions 31 have welded thereto a pair of straps 80 adapted to support (on either side as desired) a sideboard 81, extensions 82 therefrom being received by the straps 80. Further sideboards 84 are secured to the inclined I-beams 30 and still further sideboards 85 are secured to the I-beams 20 as shown in the figures.

The conveyor belts are actuated by a gasoline motor 90 which is supported by the framework 15 near the guide 14. The motor 90 drives a sprocket chain 91 which in turn drives a large sprocket 92 affixed to shaft 94 which is rotatably carried by the I-beams 20. A smaller pulley 95, also affixed to shaft 94, drives by means of a sprocket chain 96 a large sprocket wheel 97 which is similarly rotatably mounted on the I-beams 20. The sprocket wheel 97 is connected to drive shaft 66 which in turn is connected through a sprocket chain 100 to drive pulley 60 at the same speed. A twisted endless member 101 connects the shafts 66 and 78 whereby they rotate at substantially the same speed.

In operation, the sod loading attachment 10 is connected to the truck 11 as shown in the FIGURE 1 except that it is positioned by the locking means 40 in the foremost position possible relative to the truck 11. The truck 11 then proceeds to the vicinity of sod roll lying on the field which it is desired to load. As it approaches such sod rolls, the motor 80 is started and engaged to move the conveyors 16, 17 and 18 previously described. The sod rolls are manually picked from the field and laid on the horizontal conveyor 16 from whence they are conveyed via conveyor 17 to the horizontal unloading area 19, removed by hand and placed in a foremost open position on the bed of truck 11. When the sod rolls 65 are conveyed, rock, clods, and the like are somewhat loosened by the jostling of the conveyor and spill out onto the ground between the pulley 60 and the shaft 66 and also over the shaft 70 and, as noted, a collector means 102 may be provided at such locations to receive same. Since dirt and sod also tend to become dislocated and fall from the conveyors, such collector means are preferably baskets of an open wire type so that the soil will not be removed from the field. The sizes of the sod rolls are such that they will normally not touch the overhead inclined conveyor 18 unless they tend to fall back or topple from the conveyor 17. The height of the horizontal conveyor 16 is such that the average man can place sod thereon without having to lift his arms. As sod rolls 65 are placed on the conveyor 16, the truck moves slowly forward from time to time to minimize walking by those picking up the sod rolls. As the sod rolls are received in the horizontal unloading areas 19 and placed upon the truck bed, a row is completely stacked in the forward portion thereof. When this occurs, the locking pin 42 is pulled upwardly so that the locking portion 44 is removed from engagement with the aperture 37 whereupon the truck 11 moves forward until action of the spring 47 forces the locking portion 44 into the next succeeding aperutre 37 and the position of the sod loading attachment 10 is placed the distance of one row farther to the rear relative to the truck 11. This is done each time as each succeeding row of sod rolls 65 is stacked, the apertures 37 preferably being spaced apart approximately the length of the sod roll. When the truck 11 is completely loaded, the connecting members 47 and 48 are removed from the truck and are ready for attachment for the next truck to arrive in the field to be loaded.

While I have described the preferred embodiments of my invention, it is to be understood that it is capable of other adaptations and modifications within the scope of the appended claims.

Having thus described my invention, what I claim as new and desire to secure by Letters Patent of the United States is:

1. The combination of a loading attachment with a truck which comprises a mobile frame (15), a conveyor carried by said frame adapted to extend normally from the direction of travel of said truck, said conveyor including a first horizontal portion (16) adapted to extend outwardly from the truck and an inclined portion (17) in the truck vicinty, said inclined portion adapted to carry material from said horizontal portion to the vicinity of the bed of said truck, horizontal means (12) carried by said frame, said horizontal means disposed parallel to the direction of travel of said truck, means (47, 48, 50, 51) for connecting said horizontal means to said truck, guidance means (14, 35, 36) engaging with said horizontal means whereby when said horizontal means is connected to said truck said frame is movable relative thereto in a direction parallel to the direction for travel of said truck, and selective locking means (40) on said guidance means for locking the relative position of said frame with said truck.

2. The combination of a sod loading attachment with a truck which comprises a mobile frame (15), a substantially horizontal conveyor (16) carried by said frame adapted to extend in a normal direction from the direction of travel of said truck, and inclined conveyor (17) in co-operative relationship with said horizontal conveyor adapted to carry material from said horizontal conveyor to the vicinity of the bed of said truck, horizontal means carried by said frame (12), said horizontal means disposed parallel to the direction of travel of said truck, means (47, 48, 50, 51) for connecting said horizonal means to said truck, guidance means (14, 35, 36) operatively engaging said horizontal means whereby when said horizontal means is connected to said truck said frame is movable relative thereto in a direction parallel to the direction of travel of said truck, and selective locking means (40) on said guidance means for locking the relative portions of said frame with said truck.

3. A sod loader in accordance with claim 2 which includes a further inclined conveyor (18) spaced above said first mentioned inclined conveyor, said first mentioned inclined conveyor including a horizontal unloading portion (31) disposed over the bed of said truck.

4. A sod loader in accordance with claim 2 wherein said horizontal means comprises a horizontal bar (12) which is detachably connected to said truck and is slidably received in said guidance means, said guidance means being affixed to said frame.

5. A sod loader in accordance with claim 4 wherein said horizontal bar includes a plurality of apertures (37), said locking means comprising a pin (44) which extends from said guidance means into a selected one of such apertures.

6. A method of gathering sod rolls from the field and loading same onto a truck which comprises the steps of attaching conveyor means to said truck so as to extend normally therefrom to the vicinity of sod rolls in said field, placing rolls of sod on said conveyor means, conveying said rolls in a direction transverse to the longitudinal axis of said truck on said conveyor to the bed of said truck, removing said sod rolls onto said bed, continuously moving said truck in said field while loading said sod rolls, and selectively moving said conveyor to the rearward relative to said truck as sod rolls are progressively loaded in the forward portion of the bed of said truck.

References Cited
UNITED STATES PATENTS

| | | | |
|---|---|---|---|
| 244,715 | 7/1881 | Deane | 198—165 |
| 2,490,381 | 12/1949 | Shields | 198—165 |
| 2,586,324 | 2/1952 | Graves | 214—83.26 |
| 3,001,653 | 9/1961 | Wilton | 198—233 |
| 3,067,858 | 12/1962 | Loosli | 198—233 |

RICHARD E. AEGERTER, Primary Examiner